(12) United States Patent
Canaphany

(10) Patent No.: US 10,078,225 B1
(45) Date of Patent: Sep. 18, 2018

(54) INFLATABLE LIGHT BOX

(71) Applicant: Guangzhou BrandStand Display Systems Co. Ltd., Guangzhou (CN)

(72) Inventor: Ralph Canaphany, New South Wales (AU)

( * ) Notice: Subject to any disclaimer, the term of this patent is extended or adjusted under 35 U.S.C. 154(b) by 0 days.

(21) Appl. No.: 15/893,308

(22) Filed: Feb. 9, 2018

(30) Foreign Application Priority Data

Oct. 25, 2017 (CN) ............ 2017 2 1392591 U

(51) Int. Cl.
*G02B 27/02* (2006.01)
*G02B 27/04* (2006.01)
*G09F 13/04* (2006.01)

(52) U.S. Cl.
CPC ......... *G02B 27/024* (2013.01); *G02B 27/028* (2013.01); *G02B 27/04* (2013.01); *G09F 13/04* (2013.01)

(58) Field of Classification Search
CPC ............ G09F 13/04; G09F 2013/0468; G09F 2013/0481
See application file for complete search history.

(56) References Cited

U.S. PATENT DOCUMENTS

| | | | |
|---|---|---|---|
| 6,279,254 B1* | 8/2001 | Gill | G09F 19/00 40/412 |
| 6,427,369 B1* | 8/2002 | Durinzi, Jr. | G09F 13/04 362/812 |
| 6,804,905 B1* | 10/2004 | Burger, III | G09F 15/0025 40/212 |
| 2002/0105808 A1* | 8/2002 | Ting Yup | F21S 10/02 362/281 |
| 2004/0114368 A1* | 6/2004 | Shyu | F21S 10/00 362/280 |
| 2009/0178316 A1* | 7/2009 | Parenti | G09F 13/04 40/564 |
| 2012/0081905 A1* | 4/2012 | Santiago | F21V 1/22 362/294 |
| 2012/0239521 A1* | 9/2012 | Acworth | F21S 6/002 705/26.5 |
| 2013/0008064 A1* | 1/2013 | Park | G09F 15/0025 40/603 |
| 2016/0018076 A1* | 1/2016 | Santiago | F21S 4/10 362/310 |

* cited by examiner

*Primary Examiner* — Gary C Hoge
(74) *Attorney, Agent, or Firm* — Braxton Perrone, PLLC

(57) ABSTRACT

An inflatable light box includes decorative securing plates and plastic panels in association with upper and lower interior connecting planks when coupled to a cylindrical barrel in which an inflatable airbag is disposed, and encompassed by a decorative cover, form a housing for an inflatable light apparatus.

22 Claims, 2 Drawing Sheets

INFLATABLE LIGHT BOX

This application claims priority to Chinese patent application no. 201721392591.7 filed Oct. 25, 2017 and is incorporated by reference herein in its entirety.

TECHNICAL FIELD

The present invention relates to the technical field of lighting, and is specifically related to an inflatable lightbox.

BACKGROUND OF THE INVENTION

A lightbox, such as those used for an X-ray photo light box, typically comprises a lamp and preferably a PC board. These materials operate at high temperatures up to 145 degrees, and low temperature down to 55 degrees. Prior art air column light boxes, due to internal fixed instability, caused the light box to sway, affecting the users ability to observe the subject. The instability also caused uneven internal lighting, which could result in poor user performance under various circumstances. The surface material of prior art inflatable light boxes are also prone to easy wear resulting in inflatable airbag damage, and prior art inflatable light box functionality and usability is often quite limited to only limited contexts, causing user inconvenience.

BRIEF SUMMARY

The presently described inflatable light box solves the above described shortcomings in current inflatable lightboxes caused largely by internal fixture instability, resulting in the box swaying. This structural instability influences the observation ability of the user under various circumstances. In addition, the swaying can cause the inflatable light box surface to easily wear, resulting in inflatable airbag damage. The functionality of current inflatable light boxes is limited, inconveniencing users.

The presently described inflatable light box comprises a box, wherein the inner part of the box is provided with an ABS plastic panel, and the lower part of the ABS plastic panel is provided with a decorative canvas fixing plate, wherein an upper decorative canvas fixing plate and a lower decorative canvas fixed plate are each provided with a lamp group, wherein the decorative canvas fixed plate is provided with an internal connecting cloth cylinder fixing plank, wherein the inner connecting cloth cylinder is arranged below the fixing plank of the internal connection, and the auxiliary internal connection cloth cylinder fixed plank. The inner connecting cloth barrel fixing plank and the connecting place of the auxiliary internal connecting cloth cylinder fixing board are provided with an inner cloth barrel, the inside of the inner cloth cylinder or barrel is provided with an inflatable airbag, wherein the auxiliary internal connecting cloth cylinder is provided with an auxiliary decorative canvas fixing plate, and the upper surface of the auxiliary decorative canvas fixed plate is provided with a lamp set. The lower surface of the auxiliary decorative canvas fixed plate is provided with an auxiliary connecting nut, wherein the outer side of the auxiliary decorative canvas fixed plate is provided with a rubber pad, and the auxiliary ABS Plastic panel is arranged below the auxiliary decorative canvas fixed plate. A decorative canvas is arranged at the junction of the ABS plastic panel and the auxiliary ABS plastic panel, and the lamp group and the auxiliary lamp group are electrically connected with the external power supply.

In one embodiment, an inflatable light box, the box is provided with a ABS plastic panel above of the box, wherein the ABS plastic panel is provided with a decorative canvas fixing plate, wherein the upper surface of the decorative canvas fixed plate is provided with a connecting nut, and the lower surface of the decorative canvas fixed plate is provided with an auxiliary lamp group, and the bottom of the decorative canvas fixed plate is provided with an internal connecting cloth cylinder fixed plank, the inner connecting cloth cylinder is provided with an auxiliary internal connecting cloth cylinder fixing board, (the internal connection of the cloth cylinder fixed plank and auxiliary internal connection cloth cylinder fixed board between the air bag and internal cloth cylinder, in the case of inflatable, the airbag and the cloth canister can support the box, the case can be folded when the gas is released, because the upper surface of the box is a horizontal plane, The user can place the plastic panel on the surface of the box, design the box into the podium with the light, avoid the problem that the function of the inflatable lightbox is too limited, bring convenience to the user.

In one embodiment, the diameter of the air bag is relative to the inner cloth barrel, and the diameter of the inner barrel is smaller than that of the decorative canvas.

In one embodiment, the two ends of the box are provided with two planks and grooves are arranged around each plank.

In one embodiment, a side-light light source is arranged around the interior of the light box.

In one embodiment, the upper surface of the box is a horizontal plane.

The presently described inflatable light box has the beneficial effect of increased structural stability and safe and convenient use. Structurally, a plurality of fixed points are arranged inside the box, with two rigid planks arranged at both ends of the box. Each plank is provided with a groove used to install the decorative canvas and the inner cloth barrel. This arrangement provides increased structural stability. The lower surface of the box includes a plurality of pads, made in one embodiment of rubber. According to some uses, these pads reduce wear of face of the box wear. Also, the upper surface of the light box is level. Thus, use can be made of the level surface of the box plastic panel, making the box serve as a lit podium or pedestal and providing additional functionality.

DETAILED DESCRIPTION OF THE EMBODIMENTS

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
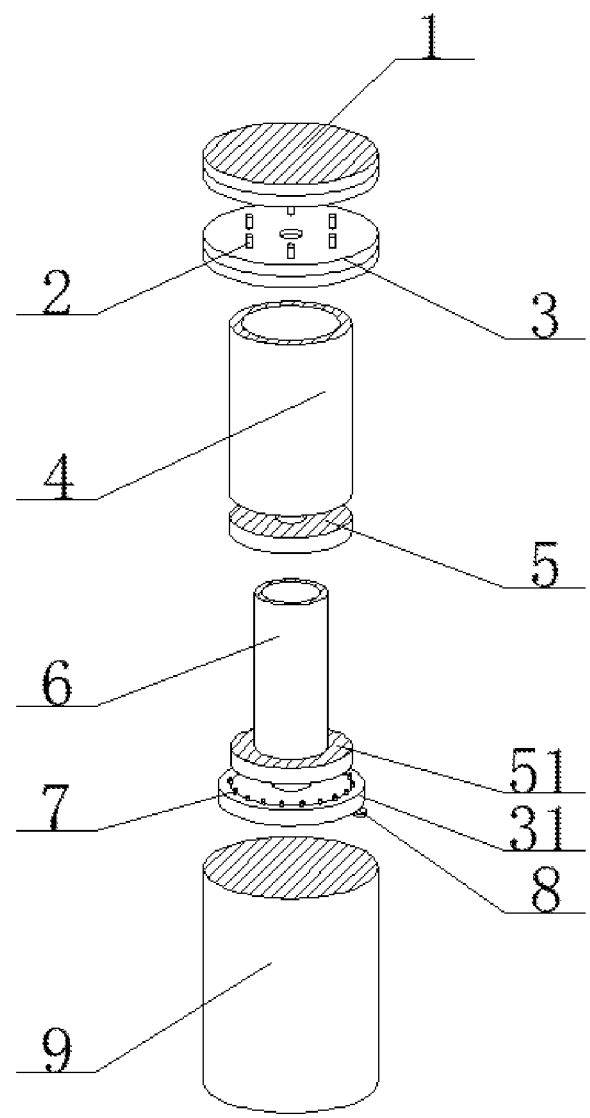
FIG. 1 is a parts diagram of an embodiment of the presently described inflatable light box.

FIG. 1 depicts ABS plastic panel 1, connection bolt 2, decorative canvas fixed plate 3, internal cloth cylinder or barrel 4, internal connection cloth cylinder fixed plank 5, inflatable airbag 6, lamp group 7, rubber cushion or pad 8, decorative canvas 9, light box 10, auxiliary ABS plastic panel 11, auxiliary connection bolt 21, auxiliary decorative canvas fixed plate 31, auxiliary internal connection cloth cylinder fixed plank 51, and auxiliary lamp group 71.

The embodiments of the present invention are clearly and sufficiently described herein in combination with the drawings provided, and the embodiments described are only exemplary embodiments, not all embodiments. Based on the embodiments all other embodiments obtained by the general technician in this field under the precondition of not making the creative labor are the scope of the protection of the utility model.

Figure 2:
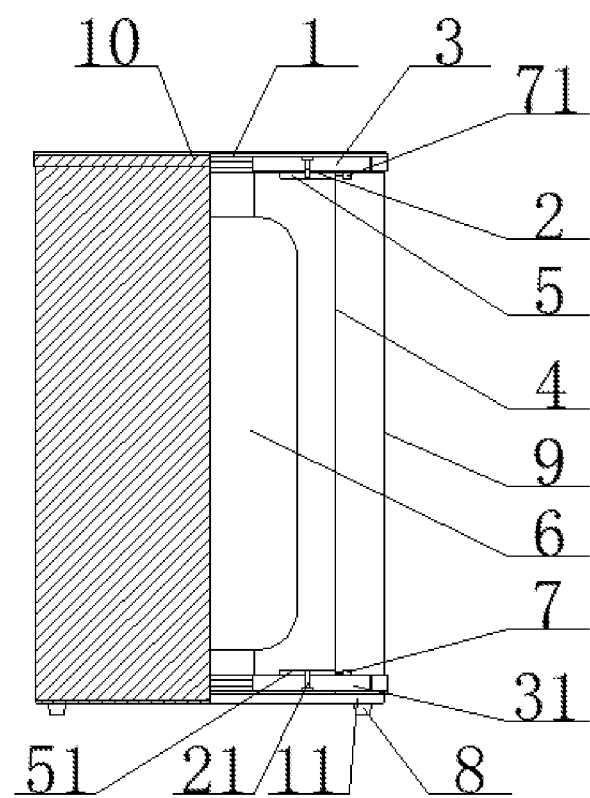
FIG. 2 is a cut-away diagram of an assembled embodiment of the presently described inflatable light box.

Referring to FIG. 1, FIG. 1 depicts the component parts of an embodiment of the inflatable light box according to the present invention. As shown, inflatable light box 10, includes ABS plastic panel 1, below which is a decorative canvas fixed plate 3. An upper surface of decorative canvas fixed plate 3 is set in place with connection screws 2. The lower surface of the decorative canvas fixed plate 3 has connected thereto auxiliary lamp group 71, as shown in FIG. 2. The decorative canvas fixed plate 3 is arranged above the inner connection cloth cylindrical fixed plank 5. The internal connection cloth tube fixed plank 5 bottom side has a corresponding auxiliary internal connection cloth tube fixed Plank 51. Internal connection cloth cylinder fixed plank 5 and auxiliary internal connection cloth cylinder fixed plank 51 are connected or serve as ends of inner cloth barrel 4. Inside inner cloth barrel 4 is situated an inflatable airbag 6. Beneath auxiliary internal connection cloth tube fixed plank 51 is auxiliary decorative canvas fixed plate 31. On the upper surface of auxiliary decorative canvas fixed plate 31 is lamp group 7. The lower surface of auxiliary decorative canvas fixed plate 31 receives connection bolt 21. Associated with the underside of auxiliary decorative canvas fixed plate 31 are cushions 8, which in one embodiment are made of rubber, but may be made of other suitable material to provide stability and prevent surface wear. Below auxiliary decorative canvas fixed plate 31 is auxiliary ABS plastic panel 11. ABS plastic panel 1 and auxiliary ABS plastic panel 11 are ends of decorative canvas 9, which surrounds the internal components of light box 10.

Light group 7 and auxiliary light group 71 are electrically connected to external power source such as an electrical outlet through an appropriate power cord or a battery.

In order for inflatable airbag 6 to be mounted inside the inner cloth barrel 4, the internal cloth barrel 4 is situated within the interior of the decorative canvas 9. In this embodiment, the diameter of the airbag 6 is smaller than the diameter of the inner cloth barrel 4, which in turn is smaller than the diameter of decorative canvas 9.

In one embodiment, structural stability of inflatable light box 10 is achieved by the two ends of light box 10 including the plank 5 and auxiliary plank 51 including grooves around the planks.

In order for light box 10 to provide sufficient illumination, in one embodiment, the light sources are provided around the entire periphery of plate 3 and auxiliary plate 31. Additionally, in one embodiment, the upper external surface of light box 10 is substantially flat, providing a usable surface that can make the inflatable light box usable as a lighted pedestal and the like.

In operation, light box 10 is placed in a work area and the inflatable airbag 6 is inflated. This causes inner cloth barrel 4 to connect with the planks 3 and 31 at each end of box 10. In this manner, the column formed by airbag 6 between two planks 3 and 31 provides structural support to form a light box 10 and the end of the box has two planks. Each plank has grooves around it, respectively, to better and more securely receive internal cloth barrel 4 and decorative canvas 9. Air bag 6 has a diameter smaller than the diameter of internal cloth barrel 4, and the internal cloth barrel 4 diameter is smaller than the diameter of decorative canvas 9. As such, the inflatable airbag 6 installed in the internal barrel 4 internal, which is installed within decorative canvas 9, with planks 5 and 51 and plates 3 and 31 on the cylinder ends, form a structure of sufficient rigidity to provide meaningful and usable structural support when airbag 6 is inflated. Within spaces on the upper and lower side of light box 10, light group 7 and auxiliary light group 71 situated around the internal perimeter of light box 10 in association with plate 3 and auxiliary plate 31, when powered, provide ample illumination of the column formed by the structural components of light box 10 as described.

The above depicts and describes the basic principles and main characteristics of the present invention and the advantages thereof. For one of skill in the art, the present invention is not limited to the details of the exemplary embodiments mentioned above, and can realize the present invention in other concrete forms without deviating from the spirit or basic characteristic of the invention. So, from whatever point of view, the embodiments shall be deemed to be exemplary and unrestricted, and the scope of the present invention is defined by the attached claims rather than the above-mentioned description, and therefore is intended to encompass all changes within the meaning and scope of the equivalent element claimed.

Although the embodiment of the utility model has been shown and described, for the general technical staff in the field, it can be understood that these embodiments can be varied, modified, replaced and revised without departing from the principle and spirit of the present invention, and the scope of the invention shall be defined by the attached claims and their equivalent.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to one or more embodiments, it will be understood by those skilled in the art that various changes in form and detail can be made therein without departing from the spirit and scope of the invention.

I claim:
1. An inflatable light box, comprising:
   a first decorative securing plate adjoined to an upper plastic panel;
   a first light source disposed on the first decorative securing plate;
   a second decorative securing plate, having a second light source disposed thereon;

at least one interior cylinder having the first decorative securing plate disposed on an upper end of the interior cylinder and the second decorative securing plate disposed on a lower end of the at least one interior cylinder; and an inflatable airbag disposed within each at least one interior cylinder; and a decorative outer cover in which are disposed the at least one interior cylinder, the inflatable airbag, the first light source and the second light source.

2. The inflatable light box of claim 1, further comprising:
a first inner connecting plank and a second inner connecting plank, wherein the first inner connecting plank is disposed beneath the first decorative securing plate and the second inner connecting plank is disposed above the second decorative securing plate.

3. The inflatable light box of claim 1, wherein at least one pad is disposed on a lower face of the second decorative securing plate.

4. The inflatable light box of claim 1, further comprising a lower plastic panel.

5. The inflatable light box of claim 1, further comprising at least one pad disposed on an exterior side of the lower plastic panel.

6. The inflatable light box of claim 4, wherein the upper plastic panel and the lower plastic panel are joined by the decorative outer cover.

7. The inflatable light box of claim 1, wherein the airbag has a diameter that is less than a diameter of the at least one interior cylinder and the diameter of the at least one interior cylinder is less than the diameter of the decorative cover.

8. The inflatable light box of claim 1, wherein the decorative cover is manufactured from fabric.

9. The inflatable light box of claim 1, wherein the decorative cover is manufactured from canvas.

10. The inflatable light box of claim 1, wherein the first inner connecting plank and second inner connecting plank each comprise a plurality of grooves around a perimeter of the first inner connecting plank and the second inner connecting plank.

11. The inflatable light box of claim 1, further comprising a substantially planar upper surface.

12. An inflatable light box, comprising:
a first decorative securing plate adjoined to an upper plastic panel;
a first light source disposed on the first decorative securing plate;
a second decorative securing plate, having a second light source disposed thereon;
a plurality of interior cylinders having the first decorative securing plate disposed on an upper end of at least one of the plurality of interior cylinders and the second decorative securing plate disposed on a lower end of the at least one of the plurality of interior cylinders; and
an inflatable airbag disposed within each of the plurality interior cylinder; and
a decorative outer cover in which are disposed the plurality of interior cylinder, the inflatable airbag, the first light source and the second light source.

13. The inflatable light box of claim 12, further comprising:
a first inner connecting plank and a second inner connecting plank, wherein the first inner connecting plank is disposed beneath the first decorative securing plate and the second inner connecting plank is disposed above the second decorative securing plate.

14. The inflatable light box of claim 12, wherein at least one pad is disposed on a lower face of the second decorative securing plate.

15. The inflatable light box of claim 12, further comprising a lower plastic panel.

16. The inflatable light box of claim 12, further comprising at least one pad disposed on an exterior side of the lower plastic panel.

17. The inflatable light box of claim 15, wherein the upper plastic panel and the lower plastic panel are joined by the decorative outer cover.

18. The inflatable light box of claim 12, wherein the airbag has a diameter that is less than a diameter of one of the plurality of interior cylinders and the diameter of the one of the plurality of interior cylinder is less than the diameter of the decorative cover.

19. The inflatable light box of claim 12, wherein the decorative cover is manufactured from fabric.

20. The inflatable light box of claim 12, wherein the decorative cover is manufactured from canvas.

21. The inflatable light box of claim 12, wherein the first inner connecting plank and second inner connecting plank each comprise a plurality of grooves around a perimeter of the first inner connecting plank and the second inner connecting plank.

22. The inflatable light box of claim 12, further comprising a substantially planar upper surface.

* * * * *